United States Patent Office
3,836,493
Patented Sept. 17, 1974

3,836,493
AQUEOUS DISPERSIONS OF EPICHLORHYDRIN MODIFIED POLYURETHANE PREPOLYMER-POLYAMINE PRODUCT
Kazuo Matsuda, Wakayama, Yoshiaki Tanaka, Osaka, and Hirakazu Aritaki, Wakayama, Japan, assignors to Kao Soap Co., Ltd., Tokyo, Japan
No Drawing. Filed Mar. 9, 1972, Ser. No. 233,304
Claims priority, application Japan, Mar. 16, 1971, 46/14,577
Int. Cl. C08g 22/14, 51/24
U.S. Cl. 260—29.2 TN                          4 Claims

ABSTRACT OF THE DISCLOSURE

Liquid, thermosetting resin compositions are prepared by reacting a urethane prepolymer containing terminal isocyanate groups with an excess amount of a polyalkylenepolyamine to form polyurethaneureapolyamine, then reacting same with epichlorohydrin and finally mixing the product with an aqueous acid solution.

BACKGROUND OF THE INVENTION

Field of the invention

The present invention relates to a process for preparing liquid, thermosetting resin compositions. More particularly, the invention relates to a process for preparing homogeneous, stable, cationic thermosetting resin solutions or aqueous emulsions.

Description of the prior art

Aqueous emulsions of polyurethanes have been used widely as coating agents, adhesives and sealing agents. However, polyurethanes of high molecular weights are generally hydrophobic and, therefore, it is difficult to disperse them directly in water to obtain homogeneous, stable emulsions. For the preparation of polyurethane emulsions, there have been known a method wherein an auxiliary emulsifying agent such as a cationic, anionic or nonionic surfactant is used, a method wherein a polyurethane containing a tertiary aminonitrogen is mixed with an aqueous acid solution and a method wherein the tertiary amino group is converted to a quaternary amino group.

However, the former method wherein an emulsifier is used requires a considerable large amount of emulsifier so that the cost of the products is high. In addition, the emulsifier sometimes causes decomposition of the emulsion or it has a bad effect on the properties of the products after they have been dried. Therefore, the use of such emulsified products is limited within an extremely narrow range. According to the latter method wherein a tertiary amino group is incorporated in a polyurethane chain to effect the quaternization, the stability of the emulsion is poor if the molecular weight of the polyurethane is too high. On the other hand, if the molecular weight of the polyurethane is reduced in order to obtain a stable emulsion thereof, the physical properties of films prepared from such emulsions become poor. Steps taken to improve the stability of the emulsion affect disadvantageously the physical properties of the resulting polyurethane films. Thus, it has been difficult to obtain stable emulsions of excellent physical properties according to known methods.

SUMMARY OF THE INVENTION

The purpose of the present invention is to prepare novel, liquid polyurethane, thermosetting resin compositions of high stability and excellent physical properties.

After intensive investigations, we have discovered that a solution or an aqueous emulsion of stable, thermosetting resin can be prepared by reacting (1) a urethane prepolymer containing terminal isocyanate groups, prepared from a polyhydroxyl compound and an excess of polyisocyanate, with (2) an excess of polyalkylenepolyamine to obtain polyurethaneureapolyamine, then reacting that product with epichlorohydrin and finally mixing the resulting product with an aqueous acid solution. The present invention has been accomplished on the basis of this discovery.

If a product made from the liquid, thermosetting resin composition obtained according to the process of the present invention is subjected to heat-treatment, for example, by heating same at a temperature in the range of 100° C. to 160° C. for a period of from 30 minutes to 3 hours, a thermosetting reaction takes place to effect cross-linking whereby the physical properties of the compositions are improved. Therefore, it is not necessary to provide an extremely high molecular weight of the polymer in the original aqueous solution or emulsion for assuring improved physical properties. According to the process of the present invention, stable, liquid polyurethane resin compositions of excellent physical properties can be provided easily.

The polyurethaneureapolyamines used for the preparation of the compositions according to the present invention can be obtained by reacting, preferably in a ketone solvent, for example, acetone and methyl ethyl ketone, a polyalkylenepolyamine with a urethane prepolymer containing terminal isocyanate groups prepared by reaction between a polyhydroxyl compound and an excess of polyfunctional isocyanate. The urethane prepolymer containing terminal isocyanate is prepared by reacting a polyhydroxyl compound and an organic diisocyanate in the presence of a solvent, such as benzene, or without solvent. In case an aromatic diisocyanate is used, the reaction temperature should be selected in the range of 60° to 100° C., while, in case an aliphatic diisocyanate is used, the reaction temperature in the range of 100 to 130° C. should be used. In the preparation of said prepolymer, the amount of the diisocyanate is preferably selected in such an amount that will enable all the functional groups contained in the polyhydroxyl compound to react with isocyanate groups. Accordingly, an excess of the diisocyanate should be used and the ratio of the total mole number of isocyanate groups to the total mole number of active hydrogen atoms in the polyhydroxyl compound is preferably in the range of 1.4:1 to 2.4:1. Any suitable organic polyfunctional isocyanate may be used for the preparation of the urethane prepolymer. Examples of suitable polyfunctional organic isocyanates are aliphatic, cycloaliphatic and aromatic diisocyanates such as 1,5-naphthylene diisocyanate, 4,4'-diphenylmethane diisocyanate, 4,4'-diphenyldimethylmethane diisocyanate, di- and tetraalkyldiphenylmethane diisocyanates, 4,4'-dibenzyl diisocyanate, 1,3-phenylene diisocyanate, 1,4-phenylene diisocyanate, toluylene diisocyanates, chlorinated isocyanates, brominated isocyanates, phosphorus-containing isocyanates, butane-1,4-diisocyanate, hexane-1,6-diisocyanate, dicyclohexylmethane diisocyanate, cyclohexane-1,4-diisocyanate and xylylene diisocyanate.

The polyhydroxyl compounds used in the preparation of urethane prepolymers used in the process of the present invention are those having molecular weights in the range of 200–10,000. As the polyhydroxyl compounds, there may be used known polyhydroxyl compounds generally used in the preparation of polyurethanes, for example, polyethers, polyesters, polyesteramides, polyacetals, polythioethers and polybutadieneglycols.

As polyethers, there may be mentioned polymerization, copolymerization or graft copolymerization products of, for example, tetrahydrofuran, ethylene oxide, propylene oxide and butylene oxide. Further, homopolyethers and mixed polyethers obtained by condensation of, for example, hexanediol, methylhexanediol, heptanediol and octanediol may also be used. In addition, propoxylated or ethoxylated glycols may be used. As polythioethers, thioglycol per se or condensation products of thioglycol and other glycols are particularly suitable. As polyacetals, there may be mentioned water-insoluble polyacetals obtained from, for example, hexanediol and formaldehyde or 4,4'-dioxyethoxydiphenyldimethylmethane and formaldehyde. If necessary, the polyols may be used together with generally used glycols such as ethylene glycol, di- and tri-ethylene glycol, butanediol, propanediol, 1,6-hexanediol, neopentylglycol and N-alkyldiethanolamines containing $C_1$–$C_{22}$ alkyl groups.

As polyalkylenepolyamines used in the process of the present invention, there can be mentioned polyalkylenepolyamines including polyethylenepolyamine, polypropylenepolyamine and polybutylenepolyamine. More particularly, the polyalkylenepolyamines used in the process of the present invention are polyamines containing in the molecule from 2 to about 8 groups in which the nitrogens are connected with one another through a —$C_nH_{2n}$— bond, wherein $n$ represents an integer larger than 1. Nitrogen atoms may be bound to adjacent carbon atoms in the —$C_nH_{2n}$— group, but two nitrogen atoms may not be bound to the same carbon atom. Specifically, there can be used polyamines such as diethylenetriamine, triethylenetetramine, tetraethylenepentamine and dipropylenetriamine, mixtures of them and various crude polyamine materials. Hydroxyalkyl-substituted polyamines may be used together with the foregoing polyamine materials. In some cases, it is desirable to increase the distance between the active hydrogen-containing amino groups in the polyurethaneureapolyamine molecules in order to modify the power of the reaction between the polyurethaneureapolyamines and epichlorohydrin or to improve the feel of the resulting products. This can be accomplished by replacing a part of the polyalkylenepolyamines with ethylenediamine, propylenediamine, hexamethylenediamine, diamines substituted with an alkyl group (i.e. $C_1$–$C_{22}$ straight chain, saturated alkyl group) and alkyleneoxide adducts, acrylonitrile adducts and acrylic ester adducts of these diamines. For this purpose, up to about 80% by molecular equivalent of the polyalkylenepolyamine may be replaced by the diamines. Generally, the desired effect can be attained by the replacement of about 50% or less, by molecular equivalent, of the polyalkylenepolyamine by the diamine.

The reaction of the urethane prepolymer containing terminal isocyanate groups with polyalkylenepolyamine is carried out preferably under atmospheric pressure in a ketone solvent at a temperature in the range of from −20° C. to +60° C. The ketone solvents which can be used in this reaction include acetone, methyl ethyl ketone, diethyl ketone, methyl isobutyl ketone and methyl isopropyl ketone. Preferably acetone and methyl ethyl ketone are used. The ketone solvents may be mixed with benzene, tetrahydrofuran, dioxane, acetate esters, dimethylformamide and chlorine-containing solvents. The duration of the reaction varies depending upon the reaction temperature and the reactivity of the polyisocyanate compound used. The reaction may be carried out for a shorter or longer period of time depending upon reaction conditions and the reaction is continued until the absorption of —NCO radical at 2280 cm.$^{-1}$ can not be recognized in the infrared spectrum measured on the samples of the reaction mixture taken during the reaction. The duration of the reaction is generally ½–2 hours. By carrying out the reaction until the above end point of the reaction, the most excellent results of film properties of the liquid thermosetting resin to be obtained by the process of the present invention are attained. In the reaction of the isocyanate groups at both ends of the urethane prepolymer molecule and polyalkylenepolyamine, the reaction with the secondary amine takes place first. Therefore, the total mole number of primary and secondary amino groups in the polyalkylenepolyamine should be larger than the whole mole number of the isocyanate groups in the diisocyanate compound. As the total mole number of amino groups becomes close to the whole mole number of the isocyanate groups, polyurethaneureapolyamines of higher molecular weight may be obtained but, at the same time, a product which is gelated or which has a high tendency to become gelated is formed. If the total mole number of the amino groups is increased greatly relative to the whole mole number of isocyanate groups, a polyurethaneureapolyamine of a low molecular weight is formed, which product does not yield a resin of excellent physical properties after reaction with epichlorohydrin. The molar ratio of the urethane prepolymer containing terminal isocyanate groups to the polyalkylenepolyamine varies depending upon the type of polyalkylenepolyamines used and the molar ratio is selected based on the desired physical properties of epichlorohydrin reaction product. In general, it is preferred to use the polyalkylenepolyamine in a sufficient quantity as compared with the urethane prepolymer. The ratio of the mole number (A) of amino groups containing active hydrogen atoms in the polyalkylenepolyamine to the mole number (B) of the isocyanate groups in the urethane prepolymer containing terminal isocyanate groups is preferably in the range of $$1 < \frac{A}{B} \leq 5,$$

more preferably, $$1 < \frac{B}{A} \leq 3.$$

The molecular weight of the polyurethaneureapolyamine is preferably in the range of 6,000 to 30,000.

In the preparation of a thermosetting resin solution or an aqueous thermosetting resin emulsion from the thus obtained polyurethaneureapolyamine, the polyurethaneureapolyamine is reacted with epichlorohydrin at a temperature of about 10°–100° C., preferably 40–70° C., until a suitable viscosity is obtained, then the heating is stopped and the reaction mixture is cooled and thereafter an aqueous acid solution is added to adjust the pH of the reaction mixture to 5–7. Thus, a stable, liquid resin composition is obtained. If the step of pH regulation to a value of 5–7 by aqueous acid solution is omitted, the system is strongly basic and, accordingly, a cross linking reaction takes place and the system gels during storage even at ambient temperature. By adding an aqueous acid solution, a transparent solution or a stable aqueous emulsion is obtained. The solvent is removed from the system by topping under heating, under reduced pressure. In general, satisfactory results are obtained by using about 0.5–2.0 moles of epichlorohydrin per mole of primary and secondary amines in the polyurethaneureapolyamine groups. The acid used as the aqueous acid solution may be either inorganic or organic acids. Particularly preferred acids are, for example, monobasic acids such as hydrochloric acid, nitric acid, formic acid, acetic acid, monochloroacetic acid, propionic acid and glycollic acid.

The acids may be used in a stabilized form by forming metal complexes with chlorides, bromides, fluorides, nitrates and sulfates of metals such as calcium, magnesium, zinc, aluminum, chromium, iron and lithium.

The liquid, cationic thermosetting resin compositions prepared according to the process of the present invention may be used as coating agents or impregnating agents for fabrics, papers, leather goods, metals, etc., anticreasing agents or antistatic agents for fibers, papers and fabrics, binders for nonwoven fabrics and furs, adhesives, elasticity-imparting agents in the construction industry, agents for preventing pulverization during transportation, binders for paints, resins for plastic concretes and binders for foundry sands. Further, the compositions according to the present invention are suitable for the preparation of films, foils and threads and also as auxiliaries or assistants in cloth printing and paper industries, as additives for synthetic resin dispersions, as general sizing agents, finishing agents for leathers and softening agents and waterproofing agents for fibers.

The process of the present invention will be illustrated by way of the following Examples, which by no means limit the scope of the invention. Unless otherwise stated, parts and percentages are by weight.

EXAMPLE 1

Seventy (70) parts of benzene and 73.1 parts (0.42 mole) of a mixture of 2,4- and 2,6-toluylenediisocyanate (80:20) were aded to 200 parts (0.21 mole) of polytetramethylene ether glycol (OHV 118) which had been dehydrated at 120° C. under 10 mm. Hg for 30 minutes. The mixture was stirred under heating at 80° C. for one hour. The mixture was then cooled to room temperature to obtain a urethane prepolymer having terminal isocyanate groups. Benzene was used for reducing the viscosity of the system and thereby facilitating treatment, but it is not always necessary to use benzene. The content of free isocyanate groups remaining in the resulting prepolymer was analyzed to be 4.85%.

Into another four neck flask, 250 parts of acetone and 6.71 parts (0.063 mole) if diethylenetriamine were placed. 93.6 parts (0.054 mole) of the above prepolymer solution were added dropwise to the mixture under stirring over 2 hours while the mitxure was kept at a temperature below 10° C. by external ice-cooling. The resulting mixture was stirred together with 5.86 parts (0.063 mole) of epichlorohydrin under heating at 50° C for 30 minutes. The mixture was cooled to room temperature and then was stirred together with 400 parts of 1% aqueous acetic acid solution to adjust the pH to 5-6. Therefater, the temperature was raised to 50-60° C. and topping was effected under reduced pressure to remove the solvent from the system. Water was added to regulate the concentration. A stable, transparent, liquid resin composition of 30% resin content was thus obtained. The resin composition was spread onto a Teflon-coated plate, allowed to stand at room temperature for 24 hours and air-dried to obtain a transparent film. The film was heat-treated to improve its physical properties, i.e., the film became insoluble in solvents or water and resistant to dilute acids. Cross linkage was thus confirmed. The physical properties of the air-dried and heat-treated products were as follows:

| | Tensile strength (kg./cm.$^2$) | 300% modulus (kg./cm.$^2$) | Elongation (percent) |
|---|---|---|---|
| Air-dried product | 78 | 25 | 836 |
| Heat-treated product (120°C., 20 mins.) | 136 | 33 | 540 |

The heat-treated product had a surface intrinsic resistance (25° C., 40% RH) of $4.0 \times 10^{11} \Omega$ and voltage half-value period (25° C., 40% RH) of 1.1 seconds.

EXAMPLE 2

Ninety (90) parts of benzene and then 100 parts (0.4 mole) of 4,4'-diphenylmethane diisocyanate were added to 189.4 part (0.2 mole) of polytetramethylene ether glycol (OHV 118) which had been dehydrated at 120° C. under 10 mm. Hg for 30 minutes. The mixture was stirred at 80° C. for one hour to effect the reaction to obtain a urethane prepolymer having terminal isocyanate groups. Analysis showed that the isocyanate group content was 4.21%. Into another four neck flask, 150 parts of acetone and 6.17 parts (0.058 moles) of diethylenetriamine were placed. 98.3 parts (0.049 mole) of the above prepolymer solution were added dropwise to the mixture under striring over 2 hours while the mixture was kept at a temperature below 10° C. by external ice-cooling. The resulting mixture was stirred together with 5.4 parts (0.058 mole) of epichlorohydrin under heating at 50° C. for 30 minutes. The mitxure was cooled to room tempera- ture and 400 parts of 1% aqueous acetic acid solution were added under stirring to adjust the pH to 5-6. The system was turbid. After the pH regulation step, the temperature was raised to 50-60° C. and the solvent was removed under reduced pressure. Water was added to adjust the concentration. A stable, aqueous emulsion of 30% resin content was thus obtained. The resin composition was spread onto a Teflon-coated plate, allowed to stand at room temperature for 24 hours and air-dried to obtain a transparent film. The physical properties of the film before and after heat treatment at 120° C. for 20 minutes were as shown below.

| | Tensile strength (kg./cm.$^2$) | Modulus (kg./cm.$^2$) 100% | Modulus (kg./cm.$^2$) 300% | Elongation (percent) |
|---|---|---|---|---|
| Air-dried product | 88 | 26 | 30 | 738 |
| Heat-treated product | 148 | 35 | 56 | 495 |

EXAMPLE 3

Ninety (90) parts of benzene and 34.8 parts of toluylene diisocyanate were added to 200 parts of polytetramethylene ether glycol (OHV 56.3). The mixture was stirred at 80° C. for one hour. The mixture was then allowed to cool to room temperature to obtain urethane prepolymer having terminal isocyanate groups. Analysis showed that the isocyanate group content was 2.50%.

Into another four neck flask, 120 parts of acetone and 2.52 parts (0.024 mole) of diethylenetriamine were placed. 68 parts (0.020 mole) of the above prepolymer solution were added dropwise to the mixture under stirring over 2 hours while the mixture was kept at a temperature below 10° C. by external ice-cooling. The resulting mixture was stirred together with 2.20 parts (0.024 mole) of epichlorohydrin under heating at 50° C. for 30 minutes. The mixture was cooled to room temperature and 350 parts of 2% aqueous acetic acid solution were added under stirring to adjust the pH to 5-6. Thereafter, the temperature was raised to 50-60° C. and the solvent was removed under reduced pressure. Water was added to adjust the concentration. A stable, aqueous resin composition of 30% resin content was thus obtained. A film was prepared from the resin composition in the same manner as in Example 1 and the physical properties of the film were examined. The physical properties of the film after heat treatment at 120° C. for 20 minutes were as shown below.

| Tensile strength (kg./cm.$^2$) | Modulus (kg./cm.$^2$) 100% | Modulus (kg./cm.$^2$) 300% | Elongation (percent) |
|---|---|---|---|
| 187 | 16 | 23 | 657 |

EXAMPLE 4

One hundred twenty (120) parts of benzene and then 50 parts of 4,4'-diphenylmethane diisocyanate were added to 200 parts of polytetramethyleneether glycol (OHV 56.3). The mixture was stirred at 80° C. for one hour to effect the reaction. Urethane prepolymer having terminal isocyanate groups was obtained. Analysis showed that the isocyanate group content was 2.27%.

Into another four neck flask, 240 parts of acetone and 2.28 parts (0.022 mole) of diethylenetriamine were placed, and then 70 parts (0.019 mole) of the above prepolymer were added to effect the reaction under the same conditions as in Example 2. The resulting mixture was stirred together with 2.0 parts (0.022 mole) of epichlorohydrin under heating at 50° C. for 30 minutes. The mixture was cooled to room temperature and mixed with 400 parts of 2% aqueous acetic acid solution under stirring to adjust the pH to 5-6. The temperature was raised to 50-60° C. and the solvent was removed under reduced pressure. Water was added to adjust the concentration. A stable, aqueous emulsion of 15% resin content was thus obtained. A film was prepared from the emulsion in the same manner as in Example 1 and heat-treated at 120° C. for 20 minutes. The physical properties of the heat-treated film were as shown below.

| Tensile strength (kg./cm.²) | Modulus (kg./cm.²) | | Elongation (percent) |
| --- | --- | --- | --- |
| | 100% | 300% | |
| Heat-treated product 219 | 17 | 21 | 795 |

EXAMPLE 5

The procedure of Example 1 was repeated under the same conditions except that 300 parts of 1% aqueous hydrochloric acid solution were used, in place of aqueous acetic acid solution, to adjust the pH to 5–6. Thus, a slightly turbid, 30% resin solution was obtained. A film was prepared in the same manner as in Example 1. The film was heat-treated at 120° C. for 20 minutes. The physical properties of the heat-treated film were as shown below.

| Tensile strength (kg./cm.²) | Modulus (kg./cm.²) | | Elongation (percent) |
| --- | --- | --- | --- |
| | 100% | 300% | |
| 121 | 14 | 28 | 580 |

EXAMPLE 6

Ten (10) parts of water in which 0.6 part of zinc chloride had been dissolved were added to 50 parts of the 30% resin solution obtained in Example 5 to obtain a turbid, non-viscous, stable resin solution.

EXAMPLE 7

Seventeen and four-tenths (17.4) parts (0.10 mole) of a mixture of 2,4- and 2,6-toluylene diisocyanates (80:20) were added to 51 parts (0.05 mole) of polypropyleneglycol (OHV 110) which had been dehydrated at 120° C. under 10 mm Hg for 20 minutes. The mixture was stirred at 90° C. for 3 hours to effect the reaction. The mixture was then cooled to room temperature to obtain urethane prepolymer having terminal isocyanate groups. Analysis showed that the isocyanate group content was 6.02%. Into another four neck flask, 10 parts of acetone and 4.35 parts (0.041 mole) of diethylenetriamine were placed. 48.8 parts (0.035 mole) of the above urethane prepolymer were added dropwise to the mixture under stirring over one hour while the mixture was kept at a temperature below 10° C. by external ice-cooling. The resulting mixture was stirred together with 3.79 parts (0.041 mole) of epichlorohydrin at 50° C. for 30 minutes. The mixture was cooled to room temperature and then 150 parts of 1% aqueous acetic acid solution were added under stirring to adjust the pH to 5–6. Thereafter, the temperature was raised to 50–60° C. and topping was effected under reduced pressure to remove the solvent from the system. Water was added to adjust the concentration. A transparent solution of 30% resin content was thus obtained. A film was prepared from the resin solution in the same manner as in Example 1 and heat-treated at 120° C. for 20 minutes. The physical properties of the film were as shown below.

| Tensile strength (kg./cm.²) | 300% modulus (kg./cm.²) | Elongation (percent) |
| --- | --- | --- |
| 108 | 20 | 683 |

EXAMPLE 8

Seventeen and four-tenths (17.4) parts of a mixture of 2,4- and 2,6-toluylene diisocyanate (80:20) were added to 57.5 parts of Pluronic L–31 (a polyoxyethylene/polyoxypropylene condensate of Wyandotte Chemicals Corp.) (OHV 97.1). The mixture was stirred at 90° C. for 3 hours to effect the reaction. The mixture was then cooled to room temperature to obtain urethane prepolymer having terminal isocyanate groups. Analysis showed that the isocyanate group content was 5.48%.

Into another four neck flask, 100 parts of acetone and 4.35 parts (0.041 mole) of diethylenetriamine were placed. 53.7 parts (0.035 mole) of the above prepolymer were added dropwise to the mixture under stirring over one hour while the temperature was kept below 10° C. by external ice-cooling. The resulting mixture was stirred together with 3.79 parts (0.041 mole) of epichlorohydrin at 50° C. for 30 minutes. The mixture was cooled to room temperature and then 150 parts of 1% aqueous acetic acid solution were added under stirring to adjust the pH to 5–6. Thereafter, the temperature was raised to 50–60° C. and topping was effected under reduced pressure to remove the solvent from the system. Water was added to adjust the concentration. A transparent, liquid resin composition of 30% resin content was thus obtained. A film was prepared from the resin composition in the same manner as in Example 1 and heat-treated at 120° C. for 20 minutes. The physical properties of the film were examined. The results were as shown below.

| Tensile strength (kg./cm.²) | 300% modulus (kg./cm.²) | Elongation (percent) |
| --- | --- | --- |
| 97 | 18 | 690 |

EXAMPLE 9

Twenty-five (25) parts of benzene, 4.5 parts (0.05 mole) of 1,4-butanediol and 34.8 parts (0.20 mole) of a mixture of 2,4- and 2,6-toluylene diisocyanate (80:20) were added to 47.8 parts (0.05 mole) of polytetramethylene ether glycol (OHV 118) which had been dehydrated at 120° C. under 10 mm. Hg for 20 minutes. The whole was stirred under heating at 80° C. for one hour. The mixture was then cooled to room temperature to obtain urethane prepolymer having terminal isocyanate groups. Analysis showed that the isocyanate group content was 7.57%.

Into another four neck flask, 250 parts of acetone and 9.33 parts (0.088 mole) of diethylenetriamine were placed and reacted with 83.2 parts (0.075 mole) of the above prepolymer under the same conditions as in Example 1. 8.2 parts (0.088 mole) of epichlorohydrin were added to the mixture and the whole was stirred under heating at 50° C. for 30 minutes. The mixture was then cooled to room tempratture and then 400 parts of 1% aqueous acetic acid solution were added under stirring to adjust the pH to 5–6. Thereafter, the temperature was raised to 50–60° C. and the solvent was removed under reduced pressure. Water was added to adjust concentration to obtain a transparent aqueous solution of 30% resin content. A film was prepared from the resin solution in the same manner as in Example 1 and heat-treated at 120° C. for 20 minutes. The physical properties of the film were examined. The results were as shown below.

| Tensile strength (kg./cm.²) | Modulus (kg./cm.²) | | Elongation (percent) |
| --- | --- | --- | --- |
| | 100% | 300% | |
| 286 | 83 | 179 | 377 |

EXAMPLE 10

Into a four neck flask, 250 parts of acetone, 5.41 parts (0.051 mole) of diethylenetriamine and 3.92 parts (0.012 mole) of N-octadecylpropylenediamine were placed. To the mixture was then added dropwise 93.6 parts (0.054 mole) of urethane prepolymer solution prepared in the same manner as in Example 1 over a period of 2 hours, while the mixture was kept at 10° C. by external ice-cooling under stirring. 4.72 parts (0.051 mole) of epichlorohydrin were added to the mixture and the whole was stirred under heating at 50° C. for 30 minutes. After cooling to room temperature, 300 parts of 1% aqueous acetic acid solution were added to adjust the pH to 5-6. Thereafter, the temperature was elevated to 50-60° C. and topping was effected under reduced pressure to remove the solvent from the system. Water was added to adjust the concentration to obtain a stable, aqueous emulsion of 30% resin content. A film was prepared from the resin solution in the same manner as in Example 1 and heat-treated at 120° C. for 20 minutes. The physical properties of the film were examined. The results were as shown below.

| Tensile strength (kg./cm.²) | 300% modulus (kg./cm.²) | Elongation (percent) |
|---|---|---|
| 123 | 28 | 590 |

The embodiments of the invention in which an exclusive property or privilege is claimed are defined as follows:

1. A process for preparing a liquid, thermosetting resin composition, which comprises,
    (1) reacting, in the liquid phase and in a ketone solvent, at a temperature of from −20° C. to +60° C., (A) isocyanate-terminated urethane prepolymer prepared by reacting organic polyol having a molecular weight in the range of 200 to 10,000 with an excess of organic polyisocyanate, with (B) an excess of polyalkylenepolyamine such that the total mole number of primary and secondary amino groups in the polyalkylenepolyamine is greater than the total mole number of isocyanate groups in the isocyanate-terminated urethane prepolymer until the presence of —NCO groups cannot be detected, whereby to form polyurethaneureapolyamine,
    (2) reacting in the liquid phase, at a temperature of from about 10 to about 100° C., the reaction product of step (1) with from about 2.0 moles of epichlorohydrin per mole of primary and secondary amino groups in the polyurethaneureapolyamine,
    (3) mixing the product of step (2) with an aqueous acid solution to adjust the pH of the product of step (2) to be in the range of from about 5 to about 7, and
    (4) treating the product of step (3) to remove the solvent therefrom and thereby obtaining an aqueous thermosetting resin composition as a final product.

2. A process according to Claim 1, in which the reactant (B) includes up to 80%, by molecular equivalent, of alkylenediamines or alkyleneoxide adducts, acrylonitrile adducts or acrylic ester adducts thereof.

3. A process according to Claim 1 in which the ratio of (a) the total mole number of amino groups containing active hydrogen atoms in the polyalkylenepolyamine to (b) the total mole number of isocyanate groups in said urethane prepolymer is in the range of $$1 < \frac{a}{b} \leq 5$$

4. A liquid thermosetting resin composition prepared by the process of Claim 1.

References Cited
UNITED STATES PATENTS

| | | | |
|---|---|---|---|
| 3,384,606 | 5/1968 | Dieterich et al. | 260—29.2 TN |
| 3,419,533 | 12/1968 | Dieterich | 260—29.2 TN |
| 3,461,103 | 8/1969 | Keberle et al. | 260—29.2 TN |
| 2,948,691 | 8/1960 | Windemuth et al. | 260—29.2 TN |
| 3,388,087 | 6/1968 | Dieterich et al. | 260—29.2 TN |
| 3,551,288 | 12/1970 | Ziemann et al. | 260—29.2 TN |
| 3,622,527 | 11/1971 | Dieterich et al. | 260—29.2 TN |

MURRAY TILLMAN, Primary Examiner

A. H. KOECKERT, Assistant Examiner

US. Cl. X.R.

117—161 KP; 260—77.5 A, 77.5 AM

UNITED STATES PATENT OFFICE
CERTIFICATE OF CORRECTION

Patent No. 3,836,493  Dated September 17, 1974

Inventor(s) Kazuo Matsuda, Yoshiaki Tanaka & Hirakazu Aritaki

It is certified that error appears in the above-identified patent and that said Letters Patent are hereby corrected as shown below:

Column 9, line 36; change "about 2.0 moles" to ---about 0.5 to about 2.0 moles---.

Signed and sealed this 28th day of January 1975.

(SEAL)
Attest:

McCOY M. GIBSON JR.
Attesting Officer

C. MARSHALL DANN
Commissioner of Patents